United States Patent
Remmert

(10) Patent No.: US 9,930,532 B2
(45) Date of Patent: Mar. 27, 2018

(54) SYSTEMS AND METHODS FOR SECURE OUT-OF-BAND WIRELESS DEVICE MANAGEMENT

(71) Applicant: Digi International Inc., Minnetonka, MN (US)

(72) Inventor: Harald Remmert, Minnetonka, MN (US)

(73) Assignee: Digi International Inc., Minnetonka, MN (US)

( * ) Notice: Subject to any disclaimer, the term of this patent is extended or adjusted under 35 U.S.C. 154(b) by 147 days.

(21) Appl. No.: 15/061,920

(22) Filed: Mar. 4, 2016

(65) Prior Publication Data

US 2017/0257764 A1 Sep. 7, 2017

(51) Int. Cl.
*H04W 12/08* (2009.01)
*H04W 8/18* (2009.01)

(52) U.S. Cl.
CPC ........... *H04W 12/08* (2013.01); *H04W 8/183* (2013.01)

(58) Field of Classification Search
CPC .............................. H04W 12/08; H04W 8/183
See application file for complete search history.

(56) References Cited

U.S. PATENT DOCUMENTS

| | | | | |
|---|---|---|---|---|
| 6,711,743 B1 * | 3/2004 | Hong | ....................... | H04N 5/76 348/E7.07 |
| 9,264,846 B2 * | 2/2016 | Stromberg | .............. | H04L 69/18 |
| 2010/0269146 A1 * | 10/2010 | Britt | ..................... | H04N 7/1675 725/110 |
| 2015/0156056 A1 | 6/2015 | Lowery | | |
| 2016/0036628 A1 * | 2/2016 | Gupta | ................... | H04W 4/005 455/420 |
| 2017/0116103 A1 * | 4/2017 | Cencini | ............... | G06F 11/3055 |

OTHER PUBLICATIONS

"5400-RM OOB Cellular Remote Manager", Dec. 17, 2015, pp. 12, Publisher: retrieved Dec. 23, 2015 from https://accelerated.com/resources/files/products/5400-RM/Accelerated_5400-RM_Cellular_Remote_Manager_Data_Sheet.pdf.

"Cisco 812 CiFi Integrated Services Routers (3g/3.7G Cellular and WiFi)", "May 2013",, pp. 1-12, Publisher: retrieved Dec. 22, 2015 from http://www.cisco.com/c/en/us/products/collateral/routers/800-series-routers/datasheet_c78-680001.html.

"Configuring Cisco EHWIC and 880G for 3.7G (HSPA+)/3.5G (HSPA)", , pp. 1-175, Publisher: retrieved on Dec. 22, 2015 from http://www.cisco.com/c/en/us/td/docs/routers/access/1800/1861/software/feature/guide/mrwls_hspa.html.

(Continued)

*Primary Examiner* — Hashim Bhatti
(74) *Attorney, Agent, or Firm* — Fogg & Powers LLC

(57) ABSTRACT

Systems and methods for secure out-of-band wireless device management are provided. In one embodiment, a network device comprises: a wireless radio module that includes: a first wireless modem, wherein the first wireless modem communicates application data over a first wireless service; a second wireless modem, wherein the second wireless modem communicates management data over a second wireless service distinct from the first wireless service; a wireless radio module management logic programmed to manage operation of the wireless radio module based on the management data communicated using the second wireless modem.

20 Claims, 3 Drawing Sheets

(56) References Cited

OTHER PUBLICATIONS

"Application Note 14: Configure a SIM cellular router to automatically failover to a second SIM card and revert back to the original SIM after a specified amount of time", Sep. 27, 2012, pp. 1-31, Publisher: retrieved Dec. 22, 2015 from http://ftp1.digi.com/support/documentation/AN_014_Dual%20SIM%20failover.pdf.

"Industrial Grade 3G 4G Dual SIM Cellular Router User Manual H720 Series", "retrieved Dec. 22 , 2015 from http://www.acandia.se/pub_docs/files/Routrar/H720_Usermanual_Eng.pdf", Jan. 22, 2014, pp. 1-97, Publisher: E-Lins Technology Co., Limited.

"Cradlepoint Takes Out-of-Band Management to the Cloud", May 6, 2015, pp. 1-2, Publisher: retrieved Dec. 23, 2015 from https://cradlepoint.com/sites/default/files/ema_cradlepoint_oobmgmt_cloud_0415_ib_1.pdf.

"Maintain Network Availability with Automatic Network Failover to Cellular", May 29, 2015, pp. 1-2, Publisher: retrieved Dec. 23, 2015 from http://www.emersonnetworkpower.com/documentation/en-US/Brands/Avocent/Documents/DataSheets/01/AV-49200.pdf.

"Huawei Configuration Guide—Interface Management Section 12: LTE Cellular Interface Configuration", pp. 1-32, Publisher: retrieved Dec. 22, 2015 from http://support.huawei.com/enterprise/docinforeader.action?contentId=DOC1000051567&partNo=10072.

"AR 150, AR 160 and AR 200 Series Enterprise Routers Brochure", Oct. 13, 2014, pp. 1-26, Publisher: Huawei Technologies Co., Ltd.

Mallett, "How to Implement Cellular Out-Of-Band Connectivity to Manage Your Distributed IT Infrastructure using Opengear Advanced Cellular Routers and Console Servers", "Cellular Out-Of-Band Access for IT Infrastructure Management", May 18, 2011, pp. 1-5, Publisher: retrieved from http://opengear.com/sites/default/files/documentation/AppNote-Cellular-Out-Of-Band.pdf.

"Cellular Out-Of-Band Highlights", , pp. 1-2, Publisher: Retrieved Dec. 23, 2015 from http://opengear.com/solutions/cellular-out-band.

"Cellular Out-Of-Band Overview", , pp. 1-2, Publisher: retrieved Dec. 23, 2015 from http://opengear.com/solutions/cellular-out-band.

"Network Resilience for Enterprise Remote Sites", , pp. 1-2, Publisher: retrieved Dec. 23, 2015 from http://opengear.com/brochures/product-resilience-gateway.pdf.

"Opengear Announces Pair of New REsilience Gateway Models at LISA15 to Meet Growing Demand", Nov. 9, 2015, pp. 1-2, Publisher: retrieved Dec. 23, 2015 from http://opengear.com/newsroom/opengear-announces-pair-new-resilience-gateway-models-lisa15-meet-growing-demand.

"SpeedFusion Bandwidth Bonding Technology", , pp. 1-6, Publisher: retrieved Dec. 22, 2015 from http://www.peplink.com/technology/speedfusion-bonding-technology.

"Siemens Launches Rugged Cellular Router", Jan. 27, 2015, pp. 1-2, Publisher: retrieved Dec. 22, 2015 from http://www.masstransitmag.com/press_release/12038585/siemens-launches-rugged-cellular-router.

"Sony XperiaC User Guide C2305/C2304", , pp. 1-123, Publisher: retrieved Dec. 22, 2015 from http://www-support-downloads.sonymobile.com/c2305/userguide_EN_C2305-C2304_2_Android4.2.pdf.

"Teldat—Wireless WAN compact routers—Product Highlights", , pp. 1-2, Publisher: retrieved Dec. 23, 2015 from http://www.teldat.com/en/page.php?cnt_id=lte-4g-3g-broadband-compact-enterprise-router-en.

"Network resilience through cellular router backup", , pp. 1-2, Publisher: retrieved Dec. 23, 2015 from http://www.teldat.com/en/page.php?cat_id=network-resilienve-cellular-router-backup.

"Out-of-Band", May 15, 2015, pp. 1-2, Publisher: retrieved Dec. 23, 2015 from http://www.uplogix.com/documents/collateral/Uplogix_out-of-band_solution_brief.pdf.

"Using 3G/4G Modems for Remote Out-of-Band Access", , pp. 1-5, Publisher: retrieved Dec. 23, 2015 from https://www.wti.com/t-wti-white-paper-using-3g-4g-for-out-of-band.aspx.

"Xperia Care User Guide", , pp. 1-5, Publisher: retrieved Dec. 23, 2015 from http://support.sonymobile.com/global-en/xperiac/userguide/Network-settings/.

* cited by examiner

SYSTEMS AND METHODS FOR SECURE OUT-OF-BAND WIRELESS DEVICE MANAGEMENT

BACKGROUND

Industrial cellular devices are often utilized to bring connectivity to devices placed in remote or difficult to reach locations. In addition to providing connectivity to rural or less developed regions with limited transportation infrastructure, industrial cellular devices may also be used to provide wireless connectivity to sensors or other electronics placed in inhospitable locations such as within storage tanks, on towers, stacks or structures of industrial plants, near dangerous operating equipment or otherwise within dangerous operating environments. Cellular connections provide data connectivity to these areas while avoiding the need to run data cables or, in some cases, the need to penetrate containment barriers such as a vessel wall.

A separate challenge is presented when these cellular device themselves have connectivity problems. When a wireless modem is activated and connects to a wireless network, if the connection over that network does go down, there is often no other way to gain access to that device other than sending a technician to troubleshoot the device locally, or simply wait to see if the connection comes back online by itself. Similarly, if a remote device is heavily utilized by application traffic or by a denial-of-service attack, the heavy traffic could complicate or interfere with efforts to remotely troubleshoot the device or change the configuration of the device to restore service. Supplemental network devices that implement out-of-band management channels present a limited solution for obtaining network access when connectivity via the cellular device is lost. However, they are not effective for situations where the cellular device itself has lost the ability to communicate with any external devices, either due to a device failure or due to misconfiguration.

For the reasons stated above and for other reasons stated below which will become apparent to those skilled in the art upon reading and understanding the specification, there is a need in the art for improved systems and methods for secure out-of-band wireless device management.

SUMMARY

The Embodiments of the present invention provide methods and systems for secure out-of-band wireless device management and will be understood by reading and studying the following specification.

Systems and methods for secure out-of-band wireless device management are provided. In one embodiment, a network device comprises: a wireless radio module that includes: a first wireless modem, wherein the first wireless modem communicates application data over a first wireless service; a second wireless modem, wherein the second wireless modem communicates management data over a second wireless service distinct from the first wireless service; a wireless radio module management logic programmed to manage operation of the wireless radio module based on the management data communicated using the second wireless modem.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide wireless network devices that comprise circuitry that supports out-of-band device management as well as normal in-band communications. That is, per embodiments of the present disclosure, a network device comprises at least one primary wireless modem for transporting data to and from an application network, and a second wireless modem used exclusively for out-of-band management of the wireless device so that if the primary wire modem loses connectivity, the second wireless modem provides access to remotely troubleshoot and reinitialize the primary connection. The second wireless modem is accessible remotely from a device management application over a wireless service distinct from the wireless service utilized by the primary modem. By accessing the network device via the second wireless modem, the device management application can exchange management data (for example, queries, commands and status information) with management logic within the network device to reconfigure and/or reinitialize the primary modem and re-establish operation of the network device without the need to send out a technician. A connectivity loss or high demand episode at the primary modem will have no effect on a network managers abilities to access the network device for device management purposes. Device configuration and management traffic will route over the management interface, whereas application traffic will route over the main network interface.

Figure 1:
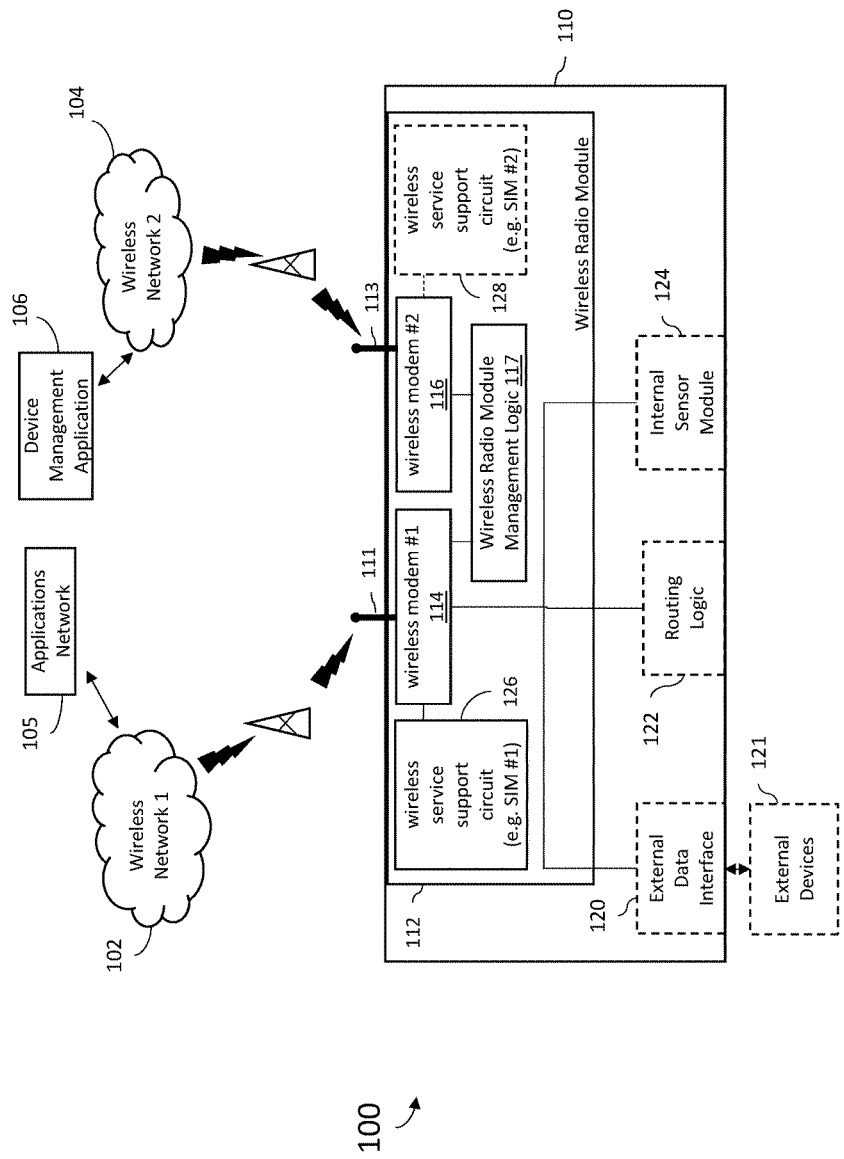
FIG. 1 is a diagram illustrating a network device of one embodiment of the present disclosure.

FIG. 1 is a diagram illustrating a network device 100 of one embodiment of the present disclosure. Network device 100 comprises at least one wireless radio module 112 that includes a first wireless modem 114 coupled to a first antenna 111 and a second wireless modem 116 coupled to a second antenna 113. In alternate embodiments the antenna 111 and 113 may be either integral within the respective wireless modem 114, 116 or alternatively may be externally coupled antenna. In still other embodiments, antenna 111 and 113 may be implemented as a single common physical device.

Wireless radio module 112 further includes a first wireless service support circuit 126 communicatively coupled to the first wireless modem 114. Depending on the wireless technology used, wireless radio module 112 may optionally also include a second wireless service support circuit 128 communicatively coupled to the second wireless modem 116. Each of the plurality of wireless service support circuits include modules (such as integrated circuits, for example) with information that configures wireless radio module 112 to establish wireless communication links over at least one wireless service of a particular wireless network operator. For example, in one embodiment, the wireless service support circuits store unique serial numbers, subscriber identity numbers, security authorization information, ciphering information or other information wireless radio module 112 would utilize to authenticate itself and establish a communication link with a particular wireless network. In some embodiments, the first wireless service support circuit 126 configures the first wireless radio modem 114 to access a first wireless network 102. For embodiments that include the second wireless service support circuit 128, it configures the second wireless radio modem 116 to access a second wireless network 104. In some implementations, the first and second wireless networks 102 and 104 may be separate networks owned and operated by the same wireless network operator. In other embodiments, they are owned and operated by different wireless network operators. The first wireless service support circuit 126 configures the first wireless radio modem 114 to access a first wireless service to access network 102. The second wireless support circuit 128 configured the second wireless radio modem 116 to access a second wireless service that is distinct from the first wireless service.

In some embodiments, the wireless service support circuits 126 and 128 may each comprise a subscriber identification module (SIM) which may be either hardwired into wireless radio module 112 or implemented as a removable/replaceable SIM cards that interface with wireless radio module 112 via card readers. In different implementations, the first and second wireless modems 114, 116 may be integrated within a single digital circuit, or alternately may comprise separate individual wireless communication modem chip sets provided within the single form-factor of network device 100. In still other embodiments, either one (or both) of the first and second wireless modems 114, 116 (including wireless service support circuits 126, 128) may be externally coupled to device 100, for example by a Universal Serial Bus (USB) port or other device interface.

The two wireless interfaces provided to device 100 by the wireless modems 114 and 116 may utilize that same wireless technologies and/or protocols in some embodiments, and different wireless technologies and/or protocols in other embodiments. With respect to specific wireless signal technologies utilized by wireless modems 114 and 116, these technologies include, but are not limited to Global System for Mobile Communications (GSM), Enhanced Data rates for GSM Evolution (EDGE), 3G or 4G cellular, 4G Long-Term Evolution (LTE), IEEE 802.11 Wi-Fi, ultra-narrow band (UNB) cellular system technologies (such as a Sigfox network, for example), random phase multiple access (RPMA) technologies (such as used by Ingenu wireless networks, for example), low power wide area networks (LPWAN) (such as Weightless technology or Weightless-N Standard networks for example), or some other wireless communication standard or proprietary protocol. For example, in one embodiment, wireless modems 114 and 116 are both cellular modems, such as but not limited to GSM 3G cellular modems. In another embodiment, a high-speed LTE CAT4 modem is used for wireless modem 114 for the application data traffic and a low-speed LTE CATI, LTE-M or NB-IOT modem is used for wireless modem 116 for the management data traffic. Utilizing relatively low speed/low bandwidth connectivity options for the management data traffic may have the benefit of providing the management interface for relatively small operating costs increment. In other embodiments, wireless modem 116 may instead utilize non-cellular technology, such as, but not limited to Digi International Inc.'s XLR industrial grade long-range 900 MHz radio, spread-spectrum modulation LoRa, IEEE 802.11 (Wi-Fi), or Bluetooth. In yet another embodiment, the wireless modem 114 for the application data traffic may also use a non-cellular technology, for example Digi International Inc.'s XLR, spread-spectrum modulation LoRa, Bluetooth or 802.11 (Wi-Fi), whereas the management interface wireless modem 116 is using a cellular technology.

Within the context of different implementations and network configurations in which device 100 may be deployed, device 100 may serve different purposes. Network device 100 may comprise, for example, one or more sensor modules 124, an external data interface 120, or routing logic 122, or some combination thereof. For example, in one embodiment, network device 100 is coupled via external data interface 120 to one or more external devices 121 where device 100 servers as a bridge, gateway, switch or router to communicate application data between external devices 121 and an application network 105 using the first wireless network 102. Application network 105 may comprise one or more applications that either utilize data from devices 121, or provide data to devices 122. In another embodiment, device 100 may instead, or further, comprise one or more internal sensor modules 124 (which may include sensors for measuring parameters such as but not limited to, sound, visual images, temperature, pressure, opacity, process flow or level, or some other measurable data or parameter) that similarly communicate application data with applications on application network 105 via the first wireless network 102. In still other embodiments, device 100 may include routing logic 122 that includes logic that routes data between devices 121, sensor modules 124 and/or applications on the application network 105 via the first wireless network communication 102. The distinction between application data and management data as those terms are used herein should be noted. Application data refers to data being transported through network device 100 that does not specifically pertain to the connectivity functions performed by network device 100. For example, where network device 100 comprises an integral sensor module 124 (for example, a temperature sensor measuring the environment around device 100), the data from that sensor would be application data. Data (either queries or commands) that does pertain to the management of connectivity functions performed by network device 100 is referred to herein as management data.

In order to establish a means for providing out-of-bound management via the second wireless modem 116, network device 100 further comprises wireless radio module management logic 117. Wireless radio module management logic 117 is coupled to the second wireless network 104 by the second wireless modem 116 and sends and receives management data with at least one device management application 106. The device management application 106 may be an application running on a remote server or network, or may be a cloud base application. As shown in FIG. 1, the second wireless modem 116 provides out-of-band management access to device 100 via the second wireless network 104. Wireless radio module management logic 117 includes functionality that may be utilized to remotely manage operation of wireless radio module 112. For example, based on management data communicated over the second wireless modem 116, wireless radio module management logic 117 may re-configure, obtain device status messages, or otherwise obtain control of wireless radio module 112 and/or network device 110 as a whole.

Figure 1A:
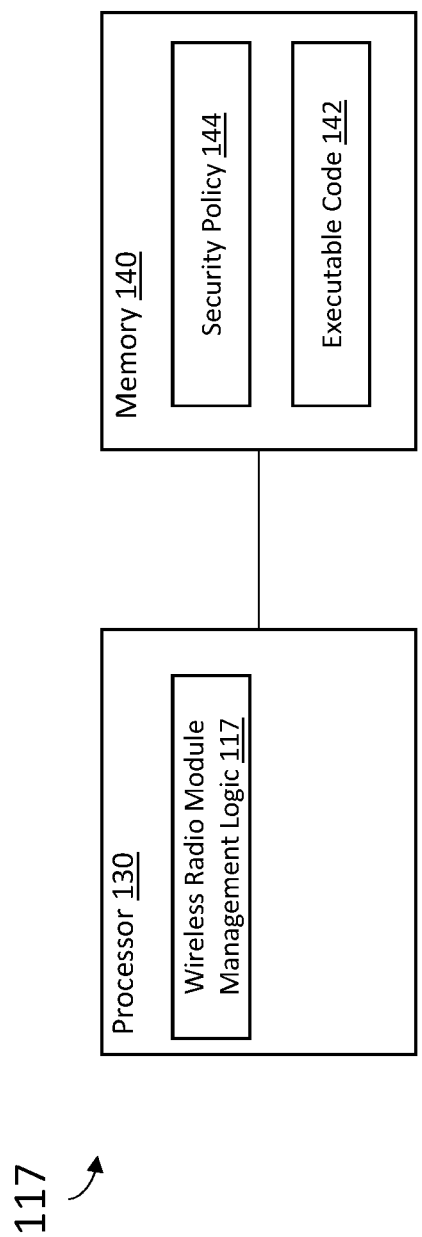
FIG. 1A is a diagram illustrating a processor implementing wireless radio module management logic for one embodiment of the present disclosure.

In one embodiment, as shown in FIG. 1A, wireless radio module management logic 117 comprises instruction code executed by a processor 130 that is coupled to a memory 140. In some embodiments, processor 130 may comprise a microprocessor, controller, or other programmable device. In other embodiments, processor 130 may comprise an application specific integrated circuit (ASIC) or Field Programmable Gate Array (FPGA) configured to implement wireless radio module management logic 117. In alternate embodiments, the memory 140 may be either internal or external to processor 130. In one embodiment, code 142 executed by processor 130 for implementing the wireless radio module management logic 117 may be stored in memory 140. In some embodiments, memory 140 may also store a security policy 144 defining users that can access wireless radio module management logic 117 via the second modem 116 and what activities each user can perform.

In one example implementation of device 100 in operation, a firewall or environment setting associated with wireless modem 114 may have been inadvertently (or maliciously) changed so that connectivity between applications network 105 and device 100 is lost. However, the device management application 106 may access wireless radio module management logic 117 through the second wireless modem 116 which is independently coupled to the device management application 106. The firewall and security for wireless modem 116 and for obtaining access to radio module management logic 117 is independent from the security scheme implemented to secure the application data transported using the first wireless modem 114. This separation allows the entity that owns device 110 or otherwise exchanges application data with device 100 using wireless modem 114 to be a separate entity than the entity that operates the device management application 106. In other words, the owner/operator of device 110 may outsource operation and management of device 100 to an independent firm responsible for maintenance of the device, without necessarily permitting that independent firm to have access to the contents of the application data stream communicated over the primary first wireless modem 114.

As described above, the embodiments describe herein permit out-of-band management of the wireless network device using a secondary wireless modem that may be either integral to, or external to, the wireless network device. With these embodiments, out-of-band management may be utilized to remotely manage any component of the wireless network device itself, and/or mange other devices that are coupled to the wireless network device. Further, out-of-band management may be accomplished even if the main network interface is down, heavily utilized or under attack.

Figure 2:
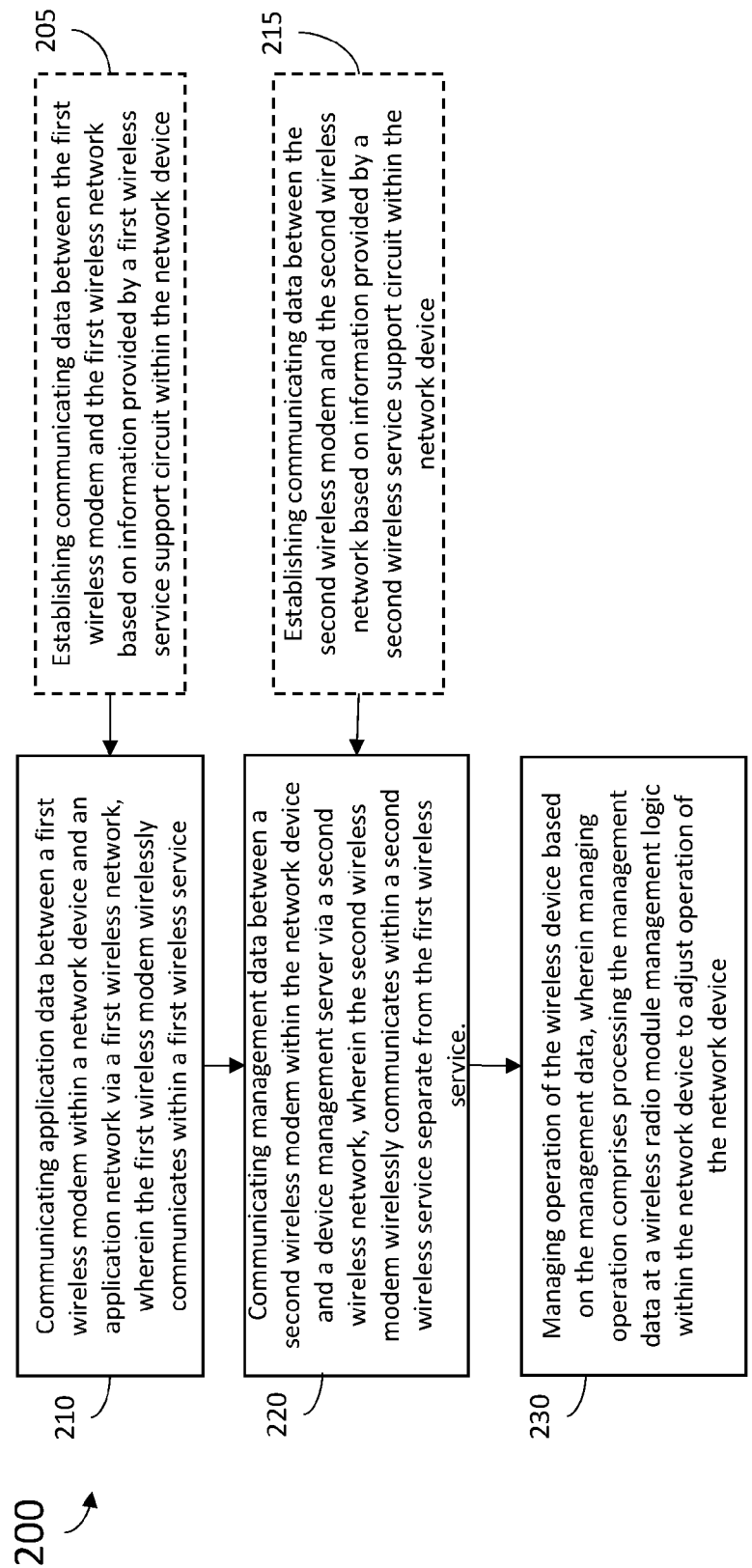
FIG. 2 is a flow chart illustrating a method of one embodiment of the present disclosure.

FIG. 2 is a flow chart illustrating a method 200 of one embodiment of the present disclosure. It should be understood that method 200 may be implemented in conjunction with any of the embodiments described above with respect to FIG. 1. As such, elements of method 200 may be used in conjunction with, in combination with, or substituted for elements of those embodiments described above. Further, the functions, structures and other description of elements for such embodiments described above may apply to like named elements of method 200 and vice versa. Method 200 may be performed using a cellular implementation of device 100 where the wireless service support circuits 114 are implemented using SIM cards. But as mentioned above, it should be appreciated that method 200 is not limited to cellular technology may be accomplished using non-cellular wireless technologies.

The method begins at 210 with communicating application data between a first wireless modem within a network device and an application network via a first wireless network, wherein the first wireless modem wirelessly communicates within a first wireless service. Within the context of different implementations and network configurations, the network device may serve one of a multitude of, or a combination of, different purposes. For example, the network device may comprise an external data interface (for example, which may include one or more communications ports) in communication with one or more external devices where the network device servers as a bridge, gateway, switch or router to communicate application data between the external devices and an application network via the first wireless network. In another embodiment, the network device may instead, or further, comprise one or more internal sensor modules (which may include sensors for measuring parameters such as but not limited to, sound, visual images, temperature, pressure, opacity, process flow or level, or some other measurable data or parameter) that similarly communicate application data with applications on the application network via the first wireless network. As such, the network device may optionally include routing logic that for routing the application data between the external devices, and internal sensor modules, and/or applications on the application network.

The method proceeds to 220 with communicating management data between a second wireless modem within the network device and a device management server via a second wireless network, wherein the second wireless modem wirelessly communicates within a second wireless service separate from the first wireless service. Application data communicated by the first wireless network refers to data being transported through the network device that does not specifically pertain to the connectivity functions performed by the network device. Management data communicated by the second wireless device, in contrast, pertains to the management of connectivity functions performed by the network device.

It should be appreciated that in different implementations of method 200, blocks 210 and 220 may be performed in any order or simultaneously. That is, in some embodiments, communication via the first wireless modem may be established first at bock 210, and communication of management data occur at some later time and block 220. In other embodiments, the first wireless modem may not be initially configured to communicate until the device is accessed via the second wireless modem in order to configure the first wireless modem. In that case, the management modem (i.e., the second wireless modem) is used to bootstrap the first wireless modem and/or other components within the device.

With respect to specific wireless signal technologies utilized by the first and second wireless modems within the network device, these technologies may include, but are not limited to Global System for Mobile Communications (GSM), Enhanced Data rates for GSM Evolution (EDGE), 3G or 4G cellular, 4G Long-Term Evolution (LTE), IEEE 802.11 Wi-Fi, ultra-narrow band (UNB) cellular system technologies (such as a Sigfox network, for example), random phase multiple access (RPMA) technologies (such as used by Ingenu wireless networks, for example), low power wide area networks (LPWAN) (such as Weightless technology or Weightless-N Standard networks, for example), or some other wireless communication standard or proprietary protocol. For example, in one embodiment, the two wireless modems are both cellular modems, such as but not limited to GSM 3G cellular modems. In another embodiment, a high-speed LTE CAT4 modem is used for wireless modem for the application data and a low-speed LTE CAT1, LTE-M or NB-IOT modem is used for management data. In other embodiments, the first wireless modem may utilize non-cellular technology, such as, but not limited to Digi International Inc.'s XLR industrial grade long-range 900 MHz radio, spread-spectrum modulation LoRa, IEEE 802.11 (Wi-Fi), or Bluetooth. In yet another embodiment, the second wireless modem for communicating the management data utilized a non-cellular technology, for example Digi International Inc.'s XLR, spread-spectrum modulation LoRa, or IEEE 802.11 Wi-Fi.

The method proceeds to 230 with managing operation of the wireless device based on the management data, wherein managing operation comprises processing the management data at a wireless radio module management logic within the network device to adjust operation of the network device. Method 200 thus provides a wireless network device that supports out-of-band device management as well as normal in-band application data communications. By accessing the network device via the second wireless modem, technicians without physical access to the network device can employ device management applications (such as, but not limited to cloud based applications for example) to exchange management data (for example, queries, commands and status information) with management logic within the network device. Out-of-band management access may then be used to reconfigure and/or reinitialize the primary first wireless modem and re-establish operation of the network device without the need to send out a technician. A connectivity loss or high demand episode at the primary modem will have no effect on a network managers abilities to access the network device for device management purposes. Device configuration and management traffic will route over the management interface, whereas application traffic will route over the main network interface.

In one embodiment, the method further comprises establishing communicating data between the first wireless modem and the first wireless network based on information provided by a first wireless service support circuit within the network device (as shown at 205) and establishing communicating data between the second wireless modem and the second wireless network based on information provided by a second wireless service support circuit within the network device (as shown at 215). That is, the first wireless service support circuit configures the first wireless radio modem to access a wireless service distinct from the wireless service that the second wireless service support circuit configures the second wireless radio modem to access. In some embodiments, the first and second wireless service support circuits may each comprise a subscriber identification module (SIM) which may be either hardwired into the wireless radio module or implemented as a removable/replaceable SIM cards that interface with the wireless radio module via card readers. In some embodiments the first and second wireless modems may be integrated within a single digital circuit, or alternately may comprise separate individual cellular modems and/or other wireless communication modems provided within the single form-factor of the network device.

EXAMPLE EMBODIMENTS

Example 1 includes a network device, the device comprising: a wireless radio module that includes: a first wireless modem, wherein the first wireless modem communicates application data over a first wireless service; a second wireless modem, wherein the second wireless modem communicates management data over a second wireless service distinct from the first wireless service; and a wireless radio module management logic programmed to manage operation of the wireless radio module based on the management data communicated using the second wireless modem.

Example 2 includes the device of example 1, further comprising a device management security policy stored in a memory coupled to the wireless radio module management logic.

Example 3 includes the device of any of examples 1-2, wherein the radio module management logic includes security for accessing the radio module management logic via the second wireless modem that is independent from security associated with the application data transported using the first wireless modem.

Example 4 includes the device of any of examples 1-3, wherein the wireless radio module management logic is controllable from a device management application that communicates with the wireless radio module over the second wireless service.

Example 5 includes the device of any of examples 1-4, wherein the first wireless radio module establishes communication with an application network over the first wireless service.

Example 6 includes the device of any of examples 1-5, wherein the first wireless modem and the second wireless modem are integrated within a single digital circuit.

Example 7 includes the device of any of examples 1-6, wherein the first wireless modem and the second wireless modem comprise separate individual wireless modem circuits provided within a single form-factor of the network device.

Example 8 includes the device of any of examples 1-7, wherein at least one of either the first wireless modem or the second wireless modem are external to the network device.

Example 9 includes the device of any of examples 1-8, wherein the wireless radio module management logic is implemented by a processor, a field programmable gate array (FPGA), or and application specific integrated circuit (ASIC).

Example 10 includes the device of any of examples 1-9, further comprising: a first wireless service support circuit coupled to the first wireless modem; and a second wireless service support circuit coupled to the second wireless modem; wherein each of the first and second wireless service support circuits includes modules that configure the radio module to establish wireless network communication links over at least one wireless service of a wireless network operator.

Example 11 includes the device of example 10, wherein at least one of the first and second wireless service support circuits comprise one or more subscriber identification modules (SIMs).

Example 12 includes the device of any of examples 10-11, wherein one or both of the first wireless modem and the second wireless modem are cellular modems.

Example 13 includes the device of any of examples 1-12, further comprising one or more sensor modules positioned within the device and configured to wirelessly communicate application data with an application network via the first wireless modem.

Example 14 includes the device of any of examples 1-13, further comprising at least one external data interface configured to communicate application data between one or more external devices coupled to the at least one external data interface and an application network via the first wireless modem.

Example 15 includes the device of example 14, further comprising routing logic that routes application data communicated between the at least one external data interface and the application network.

Example 16 includes a method comprising: communicating application data between a first wireless modem within a network device and an application network via a first wireless network, wherein the first wireless modem wirelessly communicates within a first wireless service; communicating management data between a second wireless modem within the network device and a device management server via a second wireless network, wherein the second wireless modem wirelessly communicates within a second wireless service separate from the first wireless service; and managing operation of the wireless device based on the management data, wherein managing operation comprises processing the management data at a wireless radio module management logic within the network device to adjust operation of the network device.

Example 17 includes the method of example 16, wherein communication via the second wireless modem is established first and the management data configures the first wireless modem for communicating application data.

Example 18 includes the method of any of examples 16-17, further comprising: establishing communicating data between the first wireless modem and the first wireless network based on information provided by a first wireless service support circuit within the network device; and establishing communicating data between the second wireless modem and the second wireless network based on information provided by a second wireless service support circuit within the network device.

Example 19 includes the method of example 18, wherein at least one of the first and second wireless service support circuits comprise one or more subscriber identification modules (SIMs).

Example 20 includes the method of any of examples 18-19, wherein one or both of the first wireless modem and the second wireless modem are cellular modems.

Example 21 includes the method of any of examples 16-20, wherein the radio module management logic includes security for accessing the radio module management logic via the second wireless modem that is independent from security associated with the application data transported using the first wireless modem.

Example 22 includes the method of any of examples 16-21, wherein the wireless radio module management logic is controllable from a device management application that communicates with the wireless radio module over the second wireless service.

In various alternative embodiments, system elements, method steps, or examples described throughout this disclosure (such as the wireless radio module and/or the wire radio module management logic, or sub-parts thereof, for example) may be implemented using one or more computer systems, field programmable gate arrays (FPGAs), or similar devices comprising a processor coupled to a memory and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A network device, the device comprising:
a wireless radio module that includes:
   a first wireless modem, wherein the first wireless modem communicates application data over a first wireless service;
   a second wireless modem, wherein the second wireless modem communicates management data over a second wireless service distinct from the first wireless service;
   a wireless radio module management logic programmed to manage operation of the wireless radio module based on the management data communicated using the second wireless modem;
a first wireless service support circuit coupled to the first wireless modem; and
a second wireless service support circuit coupled to the second wireless modem;
wherein each of the first and second wireless service support circuits includes modules that configure the wireless radio module to establish wireless network communication links over at least one wireless service of a wireless network operator.

2. The device of claim 1, further comprising a device management security policy stored in a memory coupled to the wireless radio module management logic.

3. The device of claim 1, wherein the radio module management logic includes security information for accessing the radio module management logic via the second wireless modem that is independent from security associated with the application data transported using the first wireless modem.

4. The device of claim 1, wherein the wireless radio module management logic is controllable from a device management application that communicates with the wireless radio module over the second wireless service.

5. The device of claim 1, wherein the first wireless radio modem establishes communication with an application network over the first wireless service.

6. The device of claim 1, wherein the first wireless modem and the second wireless modem are integrated within a single digital circuit.

7. The device of claim 1, wherein the first wireless modem and the second wireless modem comprise separate individual wireless modem circuits provided within a single form-factor of the network device.

8. The device of claim 1, wherein at least one of either the first wireless modem or the second wireless modem are coupled to a device interface.

9. The device of claim 1, wherein the wireless radio module management logic is implemented by a processor, a field programmable gate array (FPGA), or an application specific integrated circuit (ASIC).

10. The device of claim 1, wherein at least one of the first and second wireless service support circuits comprise one or more subscriber identification modules (SIMs).

11. The device of claim 1, wherein one or both of the first wireless modem and the second wireless modem are cellular modems.

12. The device of claim 1, further comprising one or more sensor modules positioned within the device and configured to wirelessly communicate application data with an application network via the first wireless modem.

13. The device of claim 1, further comprising at least one external data interface configured to communicate application data between one or more external devices coupled to the at least one external data interface and an application network via the first wireless modem.

14. The device of claim 13, further comprising routing logic that routes application data communicated between the at least one external data interface and the application network.

15. A method comprising:
communicating application data between a first wireless modem within a network device and an application network via a first wireless network, wherein the first wireless modem wirelessly communicates within a first wireless service;
communicating management data between a second wireless modem within the network device and a device management server via a second wireless network, wherein the second wireless modem wirelessly communicates within a second wireless service separate from the first wireless service;
managing operation of the wireless device based on the management data, wherein managing operation comprises processing the management data at a wireless radio module management logic within the network device to adjust operation of the network device;
establishing communicating data between the first wireless modem and the first wireless network based on information provided by a first wireless service support circuit within the network device; and
establishing communicating data between the second wireless modem and the second wireless network based on information provided by a second wireless service support circuit within the network device.

16. The method of claim 15, wherein communication via the second wireless modem is established first and the management data configures the first wireless modem for communicating application data.

17. The method of claim 15, wherein at least one of the first and second wireless service support circuits comprise one or more subscriber identification modules (SIMs).

18. The method of claim 15, wherein one or both of the first wireless modem and the second wireless modem are cellular modems.

19. The method of claim 15, wherein the radio module management logic includes security for accessing the radio module management logic via the second wireless modem that is independent from security associated with the application data transported using the first wireless modem.

20. The method of claim 15, wherein the wireless radio module management logic is controllable from a device management application that communicates with the wireless radio module over the second wireless service.

* * * * *